United States Patent [19]

Mori et al.

[11] Patent Number: 4,730,260

[45] Date of Patent: Mar. 8, 1988

[54] METHOD FOR EYEWEAR SIMULATION AND A DEVICE FOR ITS PRACTICE

[75] Inventors: Masaru Mori, Ichikawa; Tetsuo Miyake, Yokohama; Kazuaki Shimizu, Urayasu, all of Japan

[73] Assignee: Asahi Glass Company Ltd., Tokyo, Japan

[21] Appl. No.: 779,115

[22] Filed: Sep. 23, 1985

[30] Foreign Application Priority Data

Sep. 28, 1984 [JP] Japan .................................. 59-201817

[51] Int. Cl.[4] .......................... G06F 15/62; H04N 7/18
[52] U.S. Cl. ..................................... 364/518; 358/93; 358/183
[58] Field of Search .................. 358/183, 93; 364/518; 340/725

[56] References Cited

U.S. PATENT DOCUMENTS

| | | | |
|---|---|---|---|
| 4,434,467 | 2/1984 | Scott | 364/518 |
| 4,539,585 | 9/1985 | Spackova et al. | 358/183 |
| 4,602,280 | 7/1986 | Maloomian | 358/183 |

Primary Examiner—Errol A. Krass
Assistant Examiner—Ellis B. Ramirez
Attorney, Agent, or Firm—Oblon, Fisher, Spivak, McClelland & Maier

[57] ABSTRACT

An image of a person who has taken off his/her spectacles is taken on a video camera; then video signals for the image of the person are A/D-converted and stored into a video memory device as the digital signals; thereafter display signals are produced by synthesizing data for the image of the person and data for the spectacles frame as stored in the video memory device; and finally a state of the person with the spectacles frame being put on his/her face is displayed on a display device to thereby match the spectacles with the person.

14 Claims, 5 Drawing Figures

METHOD FOR EYEWEAR SIMULATION AND A DEVICE FOR ITS PRACTICE

BACKGROUND OF THE INVENTION

1. Field of the Invention

This invention relates to a method for eyewear simulation to display how a person looks like when he or she puts on a pair of spectacles, and a device for practice of such eyewear simulation.

2. Description of Prior Art

It has heretofore been a practice that a person who wishes to buy a pair of spectacles puts on a spectacles frame of his or her choice without lenses being fitted in the frame to make it sure, while facing a mirror, how he or she looks like with the spectacles.

However, for those persons having high degree of myopia, astigmatism, etc., it was very difficult to sufficiently grasp how the person will look, even if he or she wears a spectacles frame having no lenses fitted in them, because, when such highly myopic or astigmatic persons take off the spectacles, his or her image reflected on the mirror looks blurred even if he or she is at a considerably short distance from the mirror.

Due to this, the person was obliged to rely on any appropriate method such that, for example, he or she was first photographed by use of an instantaneously developing photographic camera or recorded in a video tape recorder (VTR), with a spectacle-frame of his or her choice being put on, after which the instant photograph or the VTR is observed through his or her spectacles of daily use to thereby judge propriety of the spectacle frame the person wishes to buy.

Such frame-selecting work as mentioned above, however, is toilsome; further, it is time-consuming and leads to a high cost for the selection of spectacle frames.

Moreover, even if the person is not so strongly myopic or astigmatic as mentioned above, it is troublesome for him or her to change a number of spectacles frames one by one; in addition, with those spectacles using plastic lenses as in the recent vogue which can be dyed in one's favorite color, it is not possible for the person to observe the condition of the spectacles, in which the degree of color-dying of the lens is varied differently. As the consequence of this, when the spectacles is completed its preparation and the person puts the spectacles on his or her face, he or she would find the spectacles to be considerably different from what he or she imagined during the initial selection.

SUMMARY OF THE INVENTION

For these reasons, therefore one of the objects of this invention is to provide a means by which various states of matching resulting from changes of the spectacles frames may be observed in a short period of time.

It is therefore a primary object of the present invention to provide an improved method for the eyewear simulation and an improved apparatus for its practice, all of which remove the above-described disadvantages inherent in the conventional methods and which apparatus, and can be operated easily.

According to the present invention, in one aspect of it, there is provided a method for eyewear simulation, wherein a spectacles frame is matched with a person, the method being characterized in that an image of a person who has taken off his or her spectacles is taken on a video camera; resultant video signals of the image of the person is A/D-converted and stored into a video memory device as digital signals; thereafter, display signals are produced by synthesizing data for the image of the person and data for the spectacles frame as stored in the video memory device; and finally a state of the person with the spectacles being put on his or her face is displayed, on a display device to thereby providing an image to match the spectacles with the person.

According to the present invention, in an alternative embodiment thereof, there is provided an apparatus for eyewear simulation which comprises a computer unit having a central processing unit, a video digitizer, a video memory device, a display interface, a memory device, and a console; a video camera; and a display device, wherein an image of a person without spectacles being put on his or her face is taken by the video camera, then video signals for the person's image are A/D-converted and stored in the video memory device in the form of digital signals, thereafter the data for the spectacles frame are superposed on the data as stored in the video memory device to produce display signals from the data in the video memory device through the display interface, thereby displaying on the display device a state of a person wearing spectacles on his or her face based on the display signals.

According to the method for eyewear simulation and the device for effecting the method according to the present invention, since the image of a person is video-taken in a state of his or her not wearing a spectacles, and then such personal image is stored in the video memory device, it is only sufficient for the person to take off the spectacles only at the time of the picture-taking, and, after the photo-taking and the storage of the image data into the video memory device, the person is in a position to observe the state of matching of the spectacles with his or her face by liberally synthesizing on the display device his or her image with any arbitrary spectacle-frames. On account of this, he or she is able to observe many kinds of frames in a short period of time, and, in addition, even those persons having poor eyesight are able to observe the image with the spectacles being put on his or her face, hence the state of matching of the face and the spectacles can be grasped sufficiently.

The foregoing object, other objects as well as the specific procedures of the method, and the construction and function of the device to effect the method for the eyewear simulation according to the present invention will become more apparent and understandable from the following detailed description thereof, when read in conjunction with the accompanying drawing.

DETAILED DESCRIPTION OF THE INVENTION

In the following, the present invention will be described in specific details with reference to the preferred embodiment of the present invention shown in FIG. 1.

Figure 1:
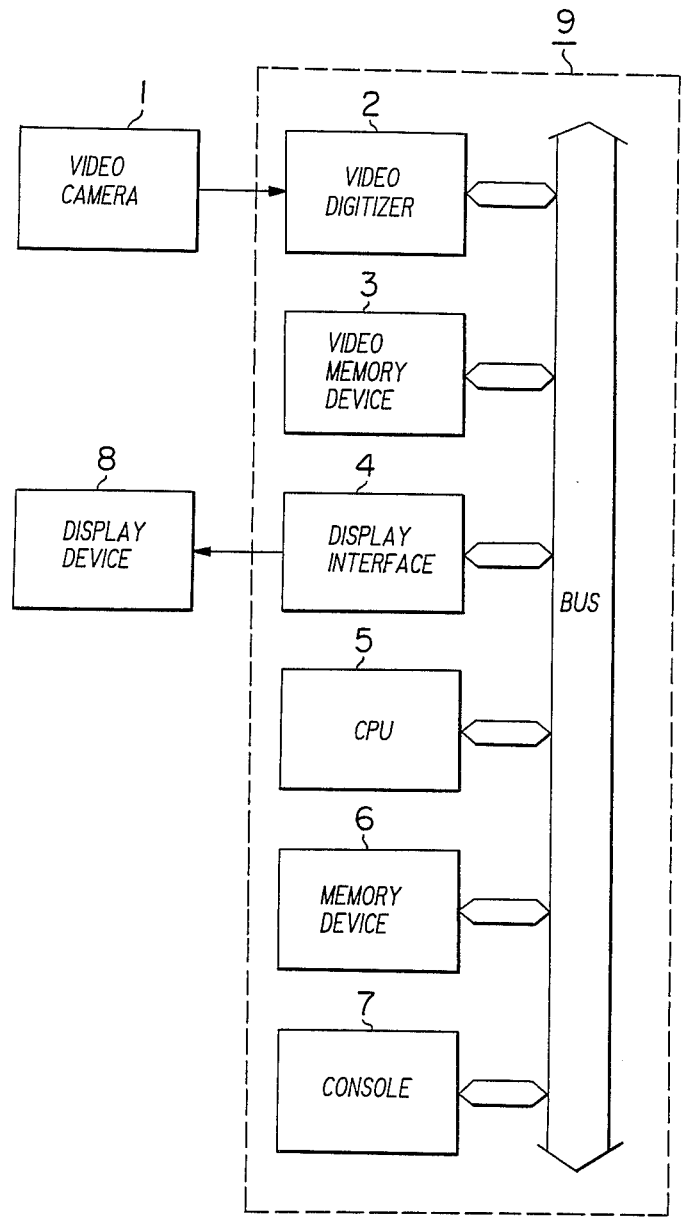
FIG. 1 is a block diagram showing one example of a basic construction of the eyewear simulation device according to the present invention.

In FIG. 1, a reference numeral 1 designates a video camera, a numeral 2 refers to a video digitizer, a numeral 3 designates a video memory device, 4 a display interface, 5 a central processing unit (CPU), 6 a memory device 7 an console, 8 a display device, and 9 a computer unit.

According to the present invention, the video signals for a person's image without wearing spectacles on his or her face, as taken by the video camera 1 are stored into the video memory device 3 through the video digitizer 2. This video camera may be an ordinary video camera for household use. When a high resolution is particularly required, a high resolution camera may also be used. While the video signal to be used is usually the video signal designated by NTSC (National Television System Committee), it may be a chrominance signal (for each color of) red (R), green (G), and blue (B). In the case of the video signal according to NTSC, it is decoded into three colors of R-G-B by means of a decoder in the video digitizer 2, after which each of the chrominance signals is digitized by an A/D converter. By effecting the gradation display, the image display becomes approximately natural, for which purpose the gradation is rendered N-bit (N=1). However, with N=4 or so, the display may generally be more natural, and moreover the capacity of the video memory device may preferable be kept small. Needless to say, when the output from the video camera is in the form of a digital signal for the color-wise (i.e., R-G-B), the video digitizer 2 may only be sufficient to store therein the signals from the video camera in synchronism with the video memory device.

By the way, in the A/D conversion operation of this video signals into the digital signals of R-G-B, the sampling time for the A/D conversion becomes as short as 100 nsec or so since the video signals involve a considerably large amount of data. Accordingly, it becomes necessary to employ a large number of A/D converters in parallel or to use a super-high-speed A/D converter. In order therefore to simplify one embodiment of this invention to make its manufacturing cost low, this embodiment of the invention is so constructed that an image of a person as taken by the video camera is once recorded in the video tape recorder, then this recorder image is played back in the still mode to thereby generate the same playback signals. With the playback signals, the picture elements (or pixels) are stored at intervals of M-number (M≧1) of the signals into the video digitizer, and finally the image of a person is taken into the video memory device with a frame of "M+1" or more.

The above-described example of the image storage operation will be explained in further detail in reference to FIG. 2.

Figure 2:
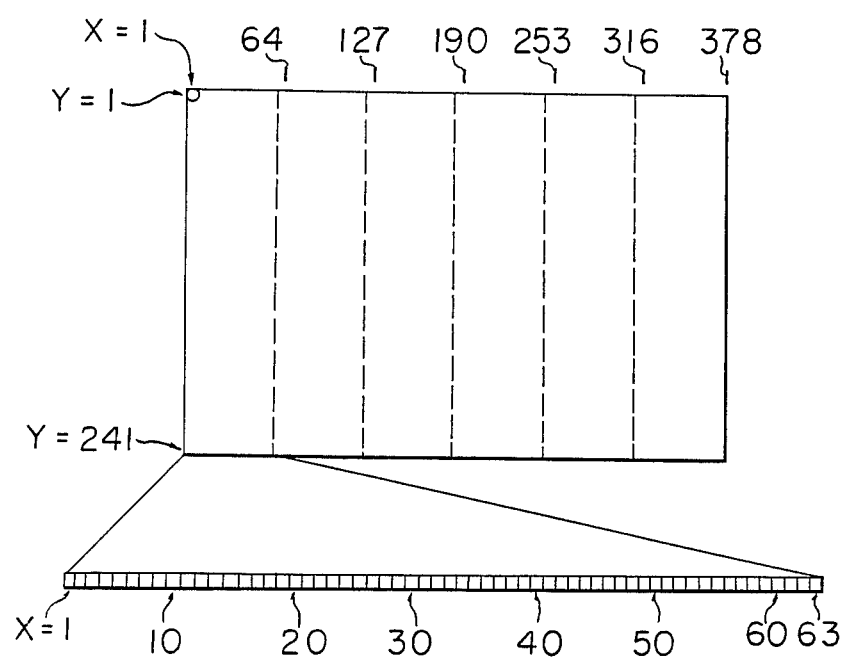
FIG. 2 is a schematic explanatory diagram indicating a method for storing picture elements in the video signals.

FIG. 2 shows a state, wherein an image is divided into 91,098 picture elements with 241 of them arranged in the vertical column (Y) and 378 of them in the horizontal row (X). These picture elements are grouped in six, each group being read at intervals of M=62 and stored in the video memory device. In more detail, at the first frame of the playback signal, those 1st, 64th, 127th, 190th, 253rd, and 316th picture elements on each scanning line running in the vertical direction are read, which are then read in the video memory device with M+1=63 frames. However, when this read-in operation is required to be repeated for the three colors of R-G-B owing to the capacity of the A/D converter for this reading, it will be done for about six seconds by use of either one of the odd-number frame (63×3=189) or even-number frame. It should be noted that this frame number is the minimum, which may become more than that depending on the waiting time, and other factors. Since the number of M is optionally determined by the capacity of the A/D converter, time for reading in varies depending on a value of M.

The number of picture elements in both vertical and horizontal directions may be arbitrarily determined in accordance with the resolution of the video camera and the resolution of the display as required, so that it is not limited to the abovementioned example.

The video memory device to be used for the present invention may usually be random access memory (RAM). In the above example, RAM having 1,093,176 bits (i.e., 136,647 bytes) is employed, since 4-bit capacity is necessary for each of the three colors of R-G-B for one picture element.

Figure 3:
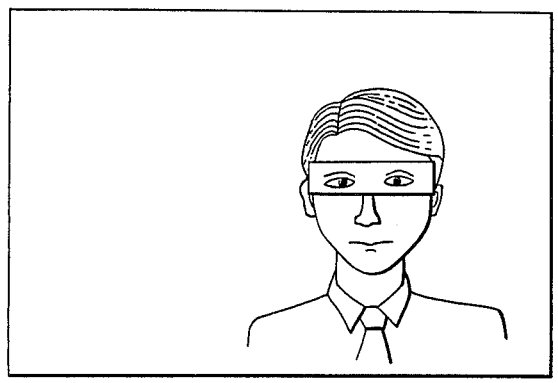
FIG. 3 is an explanatory diagram showing a state of carrying out positioning of a person's face.

In the case of storing the image of a person, the operations may be such that the image of the person as taken by the video camera is displayed on the display device and then the video camera is operated to bring the face of the person to a position where a spectacles frame is to be displayed, followed by video-taking the same. The reason for such video-taking operations is that, when synthesizing the images of the spectacles frame and the face, the fixed size, position and angle of the face would contribute to a reduced capacity of the computer. An example of this is as shown in FIG. 3, wherein the position of the spectacles frame is indicated on the display device in the form of a rectangular frame. With such arrangement for the display, it is sufficient that the video-taking be effected in a manner to bring the spectacles-wearing position on the face just into this rectangular frame by manipulating the video camera, while synthesizing and displaying both the display signal of this rectangular frame and the video signal from the video camera. In this way, it will become no longer necessary to adjust the data for the spectacles-frame to the size, position and inclination of the face, whereby the capacity at the side of the computer unit may be kept at a minimum. Into this video memory device, the data for the spectacles frame is transferred from a separate memory device for the required synthesis. While the data for the spectacles frame may be taken by the video camera at every time of its simulation, it is preferable for the sake of the speedy operation to read, in advance, those data for various spectacles frames into the memory device such as a read-only-memory (ROM), floppy disk, etc. from the video camera in the same manner as described in the above, or in the form of numerical data so as to read out these data at every time when they become necessary.

The above-described preferred method of storing the data for the spectacles frame can be readily performed by use of the device according to the present invention, about which detailed explanations will be given later.

For synthesis of the data for the personal image and the data for the spectacles frame as stored in this video memory device, it is usually sufficient that the data for the personal image at the portion of its picture elements corresponding to the position of the spectacles frame be replaced by the data for the spectacles frame, the operations of which can be done easily by judgement from the data for each picture element in the video memory device and the data in the memory device where the data for the spectacles frame are stored. More specifically, if each of the picture elements is formed of 12 bits in total (i.e., 4 bits for each of red, green and blue) as mentioned above, and if it is assumed that a "&HOOO" represents black and "&HFFF" denotes white and that the data for the spectacle frame include the data of "&Hxyz" only at the portion where the spectacles frame is present and include the data of "&HOOO" at the portion where no spectacles frame exists, it may be sufficient that the data for this spectacles frame is read out, while the memory portion of the personal image where the data correspond to the portion represented by "&HOOO" remains unchanged, and then the data for the spectacles frame may then be transferred to the memory portion of the personal image only for the picture element where any other data (&Hxyz) are present.

Further, when the personal image becomes a part of the background as is the case with matching of a semi-transparent spectacles frame or a colored lens, the data for spectacles frame and the data for the personal image may be computed in advance to prepare the composite data.

Prior to synthesis of the data for the spectacles frame and the data for the personal image, if the data for the personal image and the data for the personal image corresponding to the portions to be replaced by the spectacles frame are each stored in another memory device such as RAM, floppy disk, etc., it is possible to continuously display the same personal image with different spectacles frame without video-taking the personal image at every time after termination of the display of one spectacles frame, which is highly preferable.

In this way, the data for the personal image with the spectacles being put on its face are formed on the video memory device, and then the data are processed into the display signals through the display interface 4, with which singnals the personal image with the spectacles being put on its face is displayed on the display device 8. The forwarding of the data from this video memory device to the display interface may be done by the DMA (Direct Memory Access) through a separate exclusive bus line, not by use of the CPU bus line. It is of course possible to forward the data into the display interface via the CPU bus line. In particular, according to the present invention, as it is usually necessary to effect writing of the data into the video memory device while displaying the personal image with the spectacles being put on its face, the order of priority is given to the side of the display interface so that the read/write operations out and into the video memory device in the CPU may be stopped during the DMA. In this case, it is also possible to increase the availability factor of the CPU by providing a separate exclusive bus line other than the CPU bus line. There may, of course, be adopted a construction such that the access time to the video memory device in the CPU and the DMA time in the display interface are differentiated.

The display signals to be sent from the dispaly interface may be chosen depending on the display device to be used. That is to say, any appropriate selection can be done out of R-G-B signals, composite video signals, high frequency signals in an empty channel of television.

For the display device, there may usually be employed a color television set, a high resolution color monitor, and so forth. It is also possible to use a liquid crystal color display device, a plasma color display device, etc. which are being put into practical use in recent days.

The display interface should preferably possess a color palette for bringing into correspondence a color and a data for the selection of the color based on the gradation data for color-wise (R-G-B) in the above-described video memory device, whereby a color at a particular portion can be changed instantaneously.

With this color palette, it becomes possible to readily change a particular color of the personal image as read to any other appropriate color: for example, complexion of a person can be freely changed. Such quick color changing capability is particularly useful when a person sunburnt or tanned during the summer season is going to select a spectacles in a state of his or her not having or sunburn or tan, or inversely, when a person who is not sunburnt is going to select a spectacle matching with a state of his or her having a sunburn or tan. Therefore, this matching selection would produce a remarkable effect which cannot be obtained from mere synthesis of photographs. Needless to say, this operation can by done by arbitrary selection of color, while watching the display device. In practice, for example, various color tones of the face ranging from a light tone to a dark one are displayed in a strip form at the left margin of the personal image as displayed, out of which any desired color is selected by a key to change the complexion of the personal image. Since this change of color may be done by shifting the data at a required portion of the color palette in the image display interface, not by rewriting the data in the video memory device, it can be done at a very high speed. Restoration of the color to the one before the change took place can also be done easily.

While the change in the data for this color palette may be done by arithmetic operation, it can also be done in such a manner that, in case, for example, of the abovementioned sunburnt complexion, a plurality of progressive stages of the sunburning starting from an original complexion before the sunburning upto a sunburnt complexion (a darkened complexion)and a plurality of regressive states of the complexion starting from a sun-tanned state down to a restored state (an original light skin color) are established in advance in the display interface, and, depending on a desired degree of tan, any arbitrary data is transferred from other memory device into this color palette, whereby the color change can be done at a high speed without necessitating the arithmetic operations at every time of such color change.

In this case, too, if it is assumed that one picture element is constituted with the color data of 12 bits, as already mentioned in the foregoing, the color palette contains therein $2^{12}$ of colors (i.e., 4,096 colors). The color data "&Hxyz" for this color palette is usually made to correspond to the color data "&Hxyz" for each picture element. However, when the data for the color palette is changed to "&Habc", the color to be actually displayed will be "&Habc", even though the color data for the picture element remains "&Hxyz", hence the instantaneous color change becomes possible. For this reason, in the above-described example of the sunburnt complexion, the 4096 color-data for this color palette are prepared beforehand in correspondence to the degree of the sunburning, and stored in a separate memory device. When necessity arise, the color data are transferred from this separate memory device to the color palette, whereby the entire colors can be changed in an instant. It is, of course, possible in this case to prepare and store only the color data associated with the skin color so as not to change the other color data.

It should be noted that, when the color is changed as such, the color of the spectacles frame is also changed. In order to avoid this, the color data for the picture element at the portion of the spectacles frame alone is changed in the direction opposite to the color data for the sunburning so that the color of the spectacles frame to be displayed may not be changed. In this case, too, same as in the case of synthesis of the spectacles frame and the personal image, as mentioned in the foregoing, the color data for the spectacles frame is changed to an extent sufficient to offset the color change due to the sunburning, after which the spectacles frame is synthesized with the personal image. In this way, the display can be done easily and at a high speed. The reason for this possibility is that, since the color data for the spectacle frame is extremely small in quantity in comparison with the color data for the personal image, which enables the color data for the spectacles frame to changed in an extremely short time in comparison with that of the color data for the personal image. Furthermore, it may be feasible that the data for the spectacles frame corresponding to the degree of sunburn are prepared and stored in the memory device simultaneously with storage of the data for the spectacles frame to thereby enable the data for display to be changed in accordance with the degree of sunburn. It may, of course, be possible that the color change be done by changing the color data for each picture element, not by changing the data for the color palette, although the processing time will be taken longer.

In the same manner, it is also possible to make a display of how the spectacles frame and/or the lens as dyed will look like in combination with the complexion. In this case, the change in the color palette can also be made use of, which, however, is not so beneficial owing to necessity for a separate color palette for the portion corresponding to the spectacles frame and/or the lens, and so forth. It may therefore be simpler to change or rewrite the data for the portion corresponding to the spectacls frame and/or lens in the video memory device because the area occupied by the lens portion is very small and the time required for the change is negligible.

The CPU 5 in the computer unit according to the present invention may usually be constituted with a micro-processor of 8-bit or 16-bit capacity. It may, of course, be possible to adopt other micro-processors.

The memory device 6 includes an area for storing the data for the spectacles frame, a working area of the CPU, and an area for preserving the programs. The device usually consists of RAM and a floppy disk. This memory device 6 may, of course, include therein other memory means such as ROM, hard disk, magnetic tape, bubble memory, and so forth.

The console 7 may be of any type, provided that it is able to instruct storage of the data for the personal image from the video camera, instruct selection of the spectacles frame, and instruct selection of color of complexion of the personal image and color of the lens, and others. Examples of such console are keys, light pens, touch switches, mices, and other means capable of instructing data input.

The storage of the data for the spectacles frame may be done by various ways. For example, it may be done by the video-taking through the video camera, or by computation. Since, however, the data for the spectacles frame can be stored by the video camera by provision of some additional implements to the device according to the present invention, this former method is preferred.

The additional implements for this method are a lighting device, a hood, a background screen, a supporting pillar for the spectacles frame, and so on.

Actually, according to this method, the data for the spectacles frame are stored in a few process steps. The first step is to store the data for the shape of the spectacle frame; the second step is to store the data for the color at a portion of the spectacles frame as stored in the first step; and the third step is to correct the data for the color as stored in the second step, this last step being done depending on necessity.

In the following, detailed explanations will be given as to each of the abovementioned three steps.

The first step, as already outlined above, is to store the data for the shape of the spectacles frame, in which the video-taking is performed in a backlighted condition so that the contour of the spectacles frame may be clear. For this purpose, the lighting is done from a light source placed behind the spectacles frame. Various light sources may be used for this purpose: exmaples are an incandescent lamp, a fluorescent lamp, electroluminescence, and others. Depending on necessity, there may be disposed a light scattering board, a light reflecting board, light-guiding board, and others.

In the video-taking, the frame is fixedly positioned in a casing, and the video camera is set at its front side and the light source at its back side. During the video-taking operation, the supporting pillar for fixedly positioning the spectacles frame or the temple of the frame will be taken by the video camera. Such supporting pillar or temple may, however, be removed from the data by limiting the area, where the data are stored by A/D conversion, to the portion of the front face of the frame alone. This limited portion of the frame can be readily determined its position by only adjusting the left and right position of the video camera through superimposition of the limited portion in a rectangular frame image on a monitor television set for projecting an image which has been taken by the video camera.

Further depending on necessity, a frame showing a size of the spectacles frame is superimposed on this image, and then the video camera is zoomed to indicate the size of the spectacles frame, whereby it is not only possible to store the data for the spectacles frame with an accurate size, but also to store the data for the spectacles frame in a plurality of sizes by use of one and the same spectacles frame.

When the spectacles frame is taken by the video camera in the above-described manner, the spectacles frame is displayed in black and with a high image contrast owing to the lighting from the backside thereof, whereby its shape can be easily stored. While the data for the shape of this spectacles frame can be stored as it is, if they are quantized and stored in the RAM as the black or white data, the processing of the data thereafter becomes easier.

Subsequently, the lighting behind the spectacles frame is extinguished, followed by storage of the data for the color is effected at the second step.

In the second step, the lighting is done by the light source disposed in front of the frame so as to store the data for the color of the spectacles frame.

In this second step, it should be preferable that the spectacles frame remains in its fixed position in a casing as in the preceding step; a background screen in white or skin color, for example, is placed behind the spectacles frame; and a hood with its inner surface being colored in white is positioned between the spectacles frame and the video camera placed in front of the light source. In so doing, the spectacles frame can be illuminated from its front side with the scattered light and the accurate data for the color thereof without any shade whatsoever can be stored, and, in addition, no surrounding scenery is shown on the surface of the spectacles frame.

Since the color data is stored only in the portion where the data for the shape of the spectacles frame have been stored in the first step, there is no influence at all, even if any other images have been taken at a portion other than the spectacles frame, on account of which no problem arises at all, even if irregularities or protrusions in the interior of the casing are found in other portions than the spectacles frame.

Specifically, in the first step, the shape of the spectacle frame is rendered white data and the other portions are made the black data, then, by taking the logic AND of the data stored in the second step and the data stored in this first step, desired color data can be stored in the frame portion. For example, in case a 4-bit RAM is provided for each of the three colors of R-G-B on one picture element, wherein &HOOO represents black and &HFFF denotes white, and in case the color data are stored with &Hxyz, the color data &Hxyz are stored in the spectacle portion with &HFFF AND &Hxyz, and, in other portion, the black data &HOOO are stored with &HOOO AND &Hxyz.

In the case of an ordinary spectacles frame, accurate data for the shape and color can be stored by the above-described two steps. However, some of the spectacles frame tend to give a considerable different color tone to the eyes from what has been viewed on the display device, so that change in color is effected in the third step.

This color changing step should prefereable be done by displaying the image of the spectacles frame in a state of its being superimposed on the personal image, for which the color change is done for each of R-G-B on the data for the spectacles frame alone so that the frame may be displayed in its color which is very close to the actual color. This color change may either be done by directly rewriting the data for the color or without rewriting the data in the RAM, but by changing the correspondence in the color palette for making correspondence between the data in the RAM and the color.

While the data for the spectacles frame are usually used by being stored in the RAM, they may also be transferred, depending on necessity, into a floppy disk, a magnetic bubble memory, a magnetic tape, and so forth, wherein the data are stored for future use.

In this case too, the spectacles frame is video-taken in a size twice or three times as large as one that is to be stored primarily and then such image data are reduced in size at the time of storing the data in the video memory device, whereby it is possible to store image with high resolution even by use of a video camera having a low resolution.

Furthermore, according to the present invention, the contour of the thus stored image data can be corrected or smoothed, and, depending on the case, the data which have been input as the numerical data can be used without resorting to the video-taking.

Furthermore, for the purpose of ascertaining the spectacles frame as a part of the total fashion, there can also be displayed, in synthesis with the spectacles frame, mustache, beard, cap, hat, or other accessories such as ear-ring, neck-lace, and so forth. These data can be stored in the same manner as in the storage of the data for the spectacles frame.

By the way, in case of storing various images of still objects such as mustache, accesories, etc., besides the spectacles frame, a low speed A/D converter may be safely used in direct connection with the video camera, since the image is not movable.

However, in the case of a mobile object such as personal image, the video-taken image becomes blurred with the low speed A/D converter, hence it is preferable that the personal image once taken by the video camera is temporarily stored in the video memory device, and then the data signals are taken out as the still picture.

Besides the above, though not shown in FIG. 1, it may be feasible that, in case of using a VTR, an interface is provided for its remote control purpose, or any communicating devices are provided or connection with other external devices, or an interface for driving the display element such as a pilot lamp, LED, etc. to effect display of an object other than the personal image, or a printer for effecting image printing, and other implements are provided.

Figure 4:
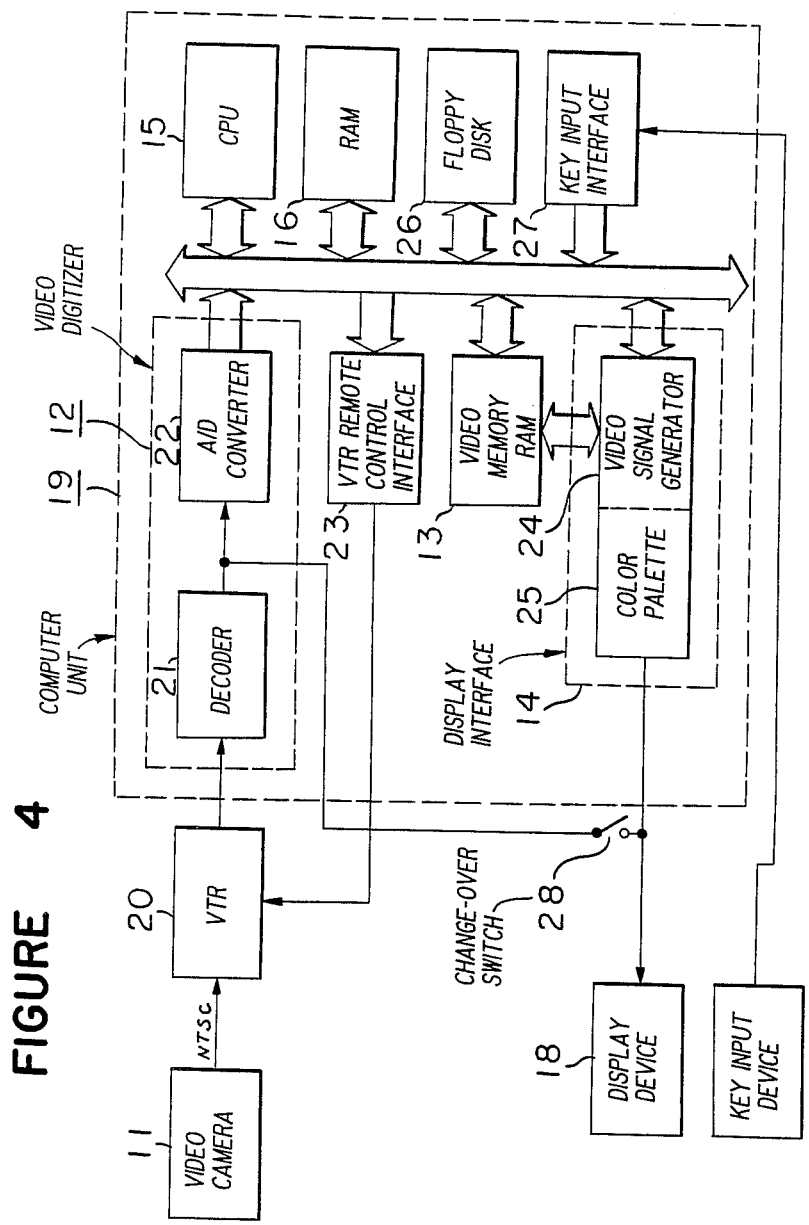
FIG. 4 is a block diagram of one preferred embodiment of the eyewear simulation device according to the present invention.

FIG. 4 is a somewhat detailed concrete block diagram of a preferred eyewear simulating device according to the present invention.

In this block diagram, a personal image without spectacles frame being put on its face is taken by a video camera 11 such as a (GX-S700 by Victor Company of Japan); and then recorded in a video tape recorder (VTR) 20 such as a (BR-6400 by Victor Company of Japan) as the NTSC video signals; thereafter, the still picture palyback signals thereof are separated into three colors of R-G-B by a decoder 21 and stored in a video memory RAM as a video memory device through an A/D converter 22 and a CPU bus line.

The data to be stored in this video memory RAM are the gradation data of 4-bit for each of the three colors of R-G-B. The data are stored in the video memory RAM in such a manner that, same as the explanations with reference to FIG. 2, the picture elements of 378 in each scanning line are divided into 6 groups and the total picture elements of 91,098 are read with 241 scanning lines in about six seconds on 63 frames for each color (total 189 frames), thereby storing the color data of 12 bits for one picture element.

The VTR 20 is controlled in such a manner that the control image input instructions are given by a key input device 17, whereupon the key-input signals enter into the CPU bus line through a key input interface 27 (such as a produced by Asahi Glass Company), and the VTR is remote-controlled through a VTR remote control interface 23 (produced by Asahi Glass).

The computer unit 19 is constructed with a video digitizer 12 (such as SDD by Cromemco Inc.) consisting of a decoder 21 and an A/D converter 22, a video memory RAM 13 (such as the 48KTP by Cromemco), a VTR remote control interface 23 (such as produced by Asahi Glass), and the key input interface 27 (such as produced by Aasahi Glass). Besides these component elements, it comprises a CPU 15 (such as the ZPU by Cromemco), a RAM 16 (such as the 64KZ-II by Cromemco)for operations, program preservation, and other purposes, a floppy disk 26 (such as the 64FDC by Cromemco and the FDD848 by Tandon Inc.) containing therein data for the spectacles frame or programs, and a display interface 14 (such as the SDI by Cromemco) composed of a color palette 25 and a video signal generator 24. The computer unit produces analog R-G-B signals in accordance with the color palette based on the data obtained by synthesis of the personal image with the spectacles frame stored in the video memory RAM 13, which data are taken out by the DMA of the display interface 14. With these video signals, the personal image with the spectacles frame being put on its face is displayed on a display device 18 (such as the KX-20HF3 produced by Sony).

The change-over switch 28 functions to display the VTR signals and a positioning mark, while a position of the face is being brought to a particular position when taking the personal image by the video camera at the initial stage of the operation, then to position the personal image as taken by the video camera by monitoring it with a monitor, and, thereafter, when the data in the video memory RAM are to be displayed, to set the personal image at the side of the video digitizer alone. In the illustrated embodiment, the change-over switch is shown as being operated manually, but it may be automatically controllable by providing a change-over switch control interface in the CPU bus line.

Figure 5:
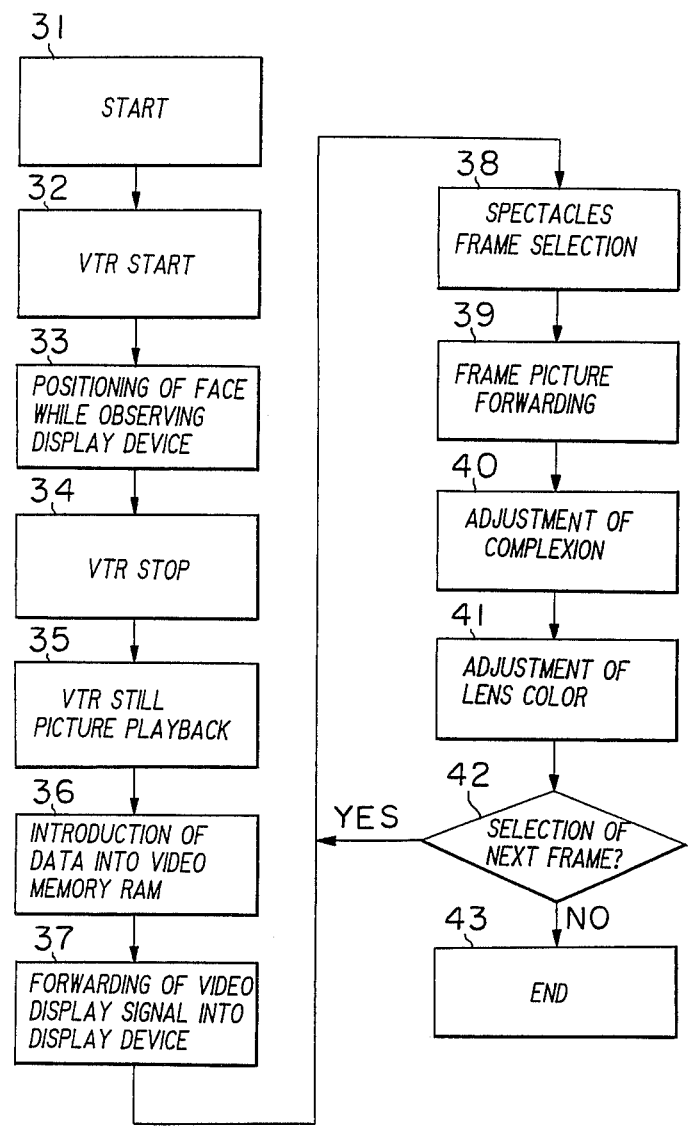
FIG. 5 is a flow chart for performing the simulation of the eyewear by use of the device shown in FIG. 4.

FIG. 5 is a flow chart showing the method for eyewear simulation using the above-described eyewear simulation device.

First of all, a person who wants to make the eyewear simulation stands in front of the video camera with his or her spectacles being taken off, and starts the eyewear simulation. After commencemet of the operation of the step (31), the VTR is started at the step(32), and the face positioning is done while observing it on the display device. In this case, when the positioning is done by displaying the image as shown in FIG. 3, wherein the video-taking signals of the video camera and the signal for displaying a spectacles frame positioning area formulated by the computer, etc. are superposed, the displayed image can be easily observed, which is preferable. While the VTR should also be started preferable before completion of the positioning, provided that the personal image after the positioning may be recorded without failure. The positioning is done in such a manner that the spectacles frame and the face of the person may be coincided on the basis of the breadth, inclination, and position of the face. In this case, while the movement of the spectacles frame in the up-and-down directions and the left-and-right directions can be done easily even at the time of the synthesis of the images, it would be of great advantage if the eyes of the person are kept horizontal and the face breadth is maintained at a constant position so that no correction needs be done in enlargement, reduction, and inclination of the spectacles frame which is difficult to adjust afterwards.

Subsequently, the VTR is stopped and rewound at the step (34), then the personal image with its face positioning having been done correctly is played back in the form of a still picture at the step (35), and the resulted NTSC video signals are converted into digital signals through the decoder and the A/D converter and such digital signals are stored in the video memory RAM at the step (36). In the next place, the display signals are prepared on the basis of the data in the video memory RAM, and then the display signals are sent out to the display device at the step (37).

Thereafter, the spectacles frame is selected at the step (38) while observing the display device or a frame catalog, and the data for the spectacles frame are stored in the video memory RAM from the floppy disk, which are then synthesized with the data for the personal image. In this case, the image data in the area where the data for the spectacles frame are to be synthesized are saved in another RAM or the floppy disk.

Then, on the basis of the data which have been used for the synthesis of these images, the display signals are prepared and sent out to the display device at the step (39), whererby the personal image with the spectacles being put on its face is displayed on the display device.

The next operation which is to change the complexion of the person at the step (40) may be done only when it becomes necessary to do so. The change in the complexion is done by selecting those colors displyed on the display device. It is not done by correction of the data in the video memory RAM, but by rewriting the data in the color palette of the display interface, whereby the correction of the complexion can be performed at a high speed.

Furthermore, the next operation which is to indicate the state of dying of the lens fitted in the spectacles frame may also be done depending on necessity at the step (41). The change in dying of the lens may also be effected by selecting those colors as displayed on the display device, and the color change is effected by correcting the data for the lens portion as stored in the video memory RAM.

After completion of the series of these operations, when a selection of a new spectacles frame is to be done, the sequence of operations goes back again to the selection of the spectacles frame at the step (38) so as to repeat the same operation. However, when the operations are to be terminated after the series of these operations, no repetition of the operations are conducted.

Also, by storing those data in the video memory RAM and the color palette after selection of this spectacles frame in other memory device, they can quickly played back when the person wants to see the images which have been observed previously.

According to the present invention, since the personal image is video-taken in the state of the spectacles being taken off and such personal image is stored in the video memory device, the person himself or herself is required to take off his or her spectacles only at the time of the video-taking, and, after this, he or she is able to liberally synthesize his or her personal image as stored in the video memory device with any arbitrary spectacles frame and to observe it on the display device, the person is able to observe as many kinds of spectacles frames as desired. At the same time, even those persons having extremely poor eyesight are able to observe his or her personal image with the own spectacles being kept on its face, so that he or she may well realize the state of his or her wearing a new spectacles frame, which is very advantageous point of the present invention.

Furthermore, the present invention can easily change, the complexion of a person to wear a new spectacles frame, and also able to readily judge whether a particular spectacles frame matches with a sunburnt face, or not. Also, when a lens in recent fashion is dyed in a desired color, the person is able to artificially snythesize the images to find out how the spectacles frame and the colored lens come with his or her face. Besides these, there are many other advantages with the present invention.

According to the present invention, since the data for the personal image, the spectacles frame, etc., once stored in the memory device, can be accessed again and again, so that the eyewear simulation can be repeated as many times as desired, hence it becomes possible to display one by one those personal images with a plurality of different spectacles frame being put on each face of the image by change-over means, or such personal images may be displayed at the same time.

Notwithstanding many advantageous points as mentioned above, the device according to the present invention does not require any complicated structure, but it can be provided at a low manufacturing cost with a high performance, with further possibility in future of its size-reduction and multi-function. Also, various applications are possible such that it can be combined with a video disk and an optical disk, and that it can be used as an image output device for a color printer, and various others.

What is claimed is:

1. A method for eyewear simulation, wherein a spectacles frame is matched with a person, said method comprising:
   projecting a reference area on a display device;
   aligning an image of a person who has taken off his/her spectacles taken with a video camera on said display device with said reference area;
   converting analog signals from said camera to digital signals representing the aligned image of the person by an A/D-conversion,
   storing into a video memory device the converted digital signals;
   thereafter displaying the aligned image which is produced by synthesizing data for the image of the person and data for the spectacles frame as stored in the video memory device; and
   finally displaying the person with the spectacles frame superimposed on his/her face on a display device to thereby match the spectacles with the person.

2. A method for eyewear simulation according to claim 1, wherein, among color data for the picture element of the personal image, those data for the picture elements of the portions corresponding to the spectacles frame are replaced by color data for the spectacles frame to be displayed on said display device.

3. A method for eyewear simulation according to claim 1, wherein color data for the picture element are changed so as to change the color of at least one part of the image.

4. A method for eyewear simulation according to claim 3, wherein the complexion of said personal image is changed.

5. A method for eyewear simulation according to claim 3, wherein color of the lens fitted in the spectacles is changed.

6. An apparatus for eyewear simulation comprising:
   a computer unit having a central processing unit;
   a video digitizer, a video memory device, a display interface, and a memory device for storing digital data connected to said central processing unit through a bus in which said memory device is directly connected,
   a video camera coupled to said video digitizer;
   a display device, having means for taking an image of a person without spectacles being put on his/her face by said video camera,
   an alignment means for projecting on said display device an alignment area for aligning the image of said person with a predetermined area on said display device,
   means for taking the video signals of the person's image, A/D-converting said image and storing said converted image in said video memory device in the form of digital signals and,
   means for synthesizing data for the spectacles frame from data stored in said video memory device to produce display signals through said display interface, thereby displaying on said display device an image of a person wearing spectacles on his/her face based on the display signals, 7. An apparatus for the eyewear simulation according to claim 6, wherein said video digitizer comprises a decoder for resolving the video signals into three colors of red, green and blue, and A/D converter connected with said decoder.

8. An apparatus for eyewear simulation according to claim 6, wherein a video tape recorder is provided between said video digitizer and said video camera, the video signals taken by said video camera being once recorded in said video tape recorder, then said video tape recorder being capable of still picture play-back, the picture elements being sent into said video digitizer at intervals of M-number ($M \geq 1$), and the image being stored in said video memory device with the frame of $M+1$ number or more.

9. An apparatus for eyewear simulation according to claim 6, wherein said video memory device possesses its capacity which affords to store therein said three colors of red, green and blue as the color data and the gradation display of N-bit ($N=2$) for each picture element, and said video digitizer prepares display signals based on said color palette.

10. An apparatus for eyewear simulation according to claim 9, wherein, among the color data for the picture element of the personal image as stored in said memory device, the data for the picture element of the portions corresponding to the spectacles frames are replaced by the color data for the spectacles frame so as to be displayed on said display device.

11. An apparatus for eyewear simulation according to claim 9, wherein, among the color data for the picture elements as stored in said video memory device, said color data of at least one part of the picture elements are changed so as to alter the color of at least one part of the image.

12. An apparatus for eyewear simulation according to claim 11, wherein the data for the picture element for the portions corresponding to spectacles lens are changed to thereby alter the color of the lens portions in said personal image.

13. An apparatus for eyewear simulation according to claim 9, wherein the data for the color palette in said video digitizer are shifted to thereby change the complexion of the personal image.

14. An apparatus for eyewear simulation according to claim 13, wherein the data for the color palette in said video digitizer is provided beforehanding a separate memory device for a plurality of different stages depending on the degree of sunburn of said personal image, and said data are transferred to said color palette in accordance with the degree of suburn to rewrite data in said color palette, thereby changing the complexion of said personal image.

* * * * *